Figure 1:
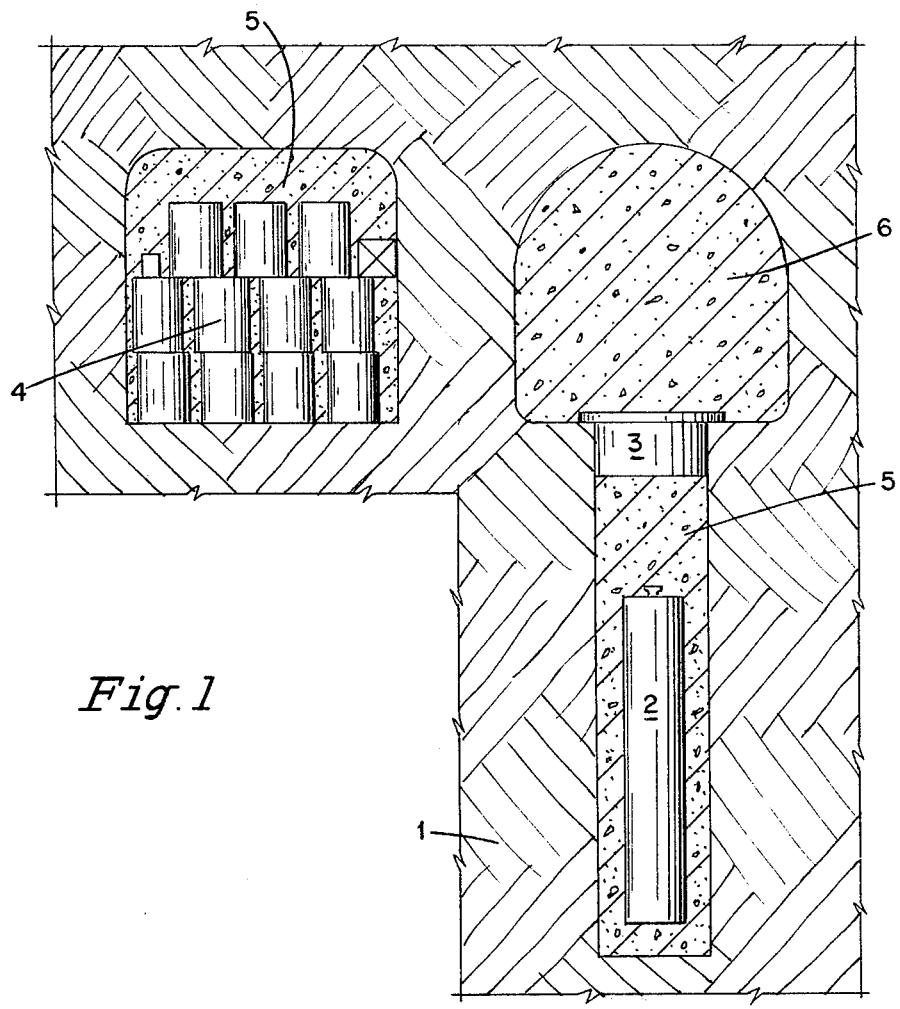

United States Patent [19]

Lennemann

[11] 4,428,700
[45] Jan. 31, 1984

[54] METHOD FOR DISPOSING OF WASTE MATERIALS

[75] Inventor: William L. Lennemann, Chevy Chase, Md.

[73] Assignee: E. R. Johnson Associates, Inc., Reston, Va.

[21] Appl. No.: 289,784

[22] Filed: Aug. 3, 1981

[51] Int. Cl.$^3$ .............................................. B09B 1/00
[52] U.S. Cl. ..................................... 405/128; 405/129; 252/628; 252/633
[58] Field of Search ............... 405/128, 129; 252/628, 252/633; 166/288, 293

[56] References Cited

U.S. PATENT DOCUMENTS

| | | | |
|---|---|---|---|
| 978,359 | 12/1910 | Cooper | 166/288 |
| 1,398,563 | 11/1921 | Nolan | 166/288 |
| 3,152,984 | 10/1964 | Winsche et al. | 252/628 |
| 4,058,500 | 11/1977 | Vroom | 260/42.24 |
| 4,230,597 | 10/1980 | Bustard et al. | 252/628 |
| 4,269,728 | 5/1981 | Schweitzer et al. | 252/633 |
| 4,311,826 | 1/1982 | McBee et al. | 528/389 |
| 4,316,814 | 2/1982 | Verpmann | 405/128 |
| 4,335,978 | 6/1982 | Mutch | 405/129 |
| 4,348,313 | 9/1982 | McBee et al. | 524/788 |

Primary Examiner—Dennis L. Taylor
Assistant Examiner—John A. Gungor
Attorney, Agent, or Firm—James J. Brown

[57] ABSTRACT

A method is described for the confinement and isolation of waste materials, especially those that are toxic or otherwise hazardous such as radioactive wastes. The waste material, either contained or uncontained, is emplaced in a underground or surface excavation and encased with backfill or barrier material formed of molten modified sulfur cement or modified sulfur concrete that then cools into a hard, durable, corrosion resistant mass.

19 Claims, 2 Drawing Figures

METHOD FOR DISPOSING OF WASTE MATERIALS

BACKGROUND OF THE INVENTION

The effective confinement and isolation of waste materials for disposal, especially those materials that are hazardous or toxic such as radioactive wastes, continues to present a serious and difficult problem. With varying degrees of success or failure such materials have, for example, been incorporated into matrices and sealed in containers and placed in surface or underground excavations and covered with backfill material. The purpose of the barrier or backfill material is to protect the toxic substances in the hazardous material from leaching and movement by ground water action and further isolate and confine the toxic substances within their storage or disposal host environment. Materials that mainly have been used in the prior art or are being proposed as barrier or backfill material around and over containers of hazardous materials or uncontained hazardous material being stored or disposed of in underground or surface excavations are the crushed host rock or soil materials, gravels, sands, certain clays, and various mixtures of two or more of them. Ordinary and special cements and concretes also have been used or proposed, but have not proven entirely satisfactory.

Among the desirable properties for a barrier or backfill material are the following. It should:

1. Form an impervious barrier to the action of ground and saline waters;
2. Have a low leaching rate, particularly by ground or saline waters;
3. Be a relatively inert material;
4. Have good resistance to chemical and physical degradation and biological processes;
5. Be compatible with the containers or uncontained hazardous material and the host environment;
6. Exhibit a long term satisfactory behavior as a barrier or backfill material in the storage or disposal environment;
7. Be in plentiful supply at reasonable cost;
8. Be easily handled and controlled from operating and manufacturing standpoints.

It has been recognized, that so-called sulfur cements and concretes which are essentially cast molten sulfur which may contain aggregate or other strengthening materials possess good resistance to corrosion and could be used for a variety of essentially structural uses. It has recently become known that the properties of such materials can be modified and improved by inclusion of various organic plasticizers to produce what is known as modified sulfur cements and concretes. Among the uses which have been suggested for these materials are rigid concretes, flexible pavings, spray coating and grouts. It has also been proposed to employ such materials for the containment on a temporary basis of highly corrosive compounds such as acidic and salt solutions. The use and formulation of these materials is for example discussed in the following publications, the substance of which is incorporated herein by reference:

McBee et al, "Modified Sulfur Cements For Use In Concretes, Flexible Pavings, Coatings, and Grouts" U.S. Department of Interior, Bureau of Mines Report 8544, 1981;

*Sulfur Research and Development*, vol 2, 1979, published by The Sulfur Institute;

*Sulfur Research and Development*, vol. 4, 1981, published by The Sulfur Institute.

It has not been, however, proposed to employ modified sulfur cements and concretes as backfill or barrier materials for containing hazardous wastes such as radioactive materials for indefinite periods of time.

It is therefore an object of the present invention to provide a method for containing hazardous waste materials by using modified sulfur cements or concretes as a backfill or barrier material.

The present invention is directed to a method for the containment of waste materials, such as radioactive waste, in which the waste material is emplaced in underground or surface excavations and modified sulfur cement or concrete is employed as a backfill or barrier material to encase waste material which may be either in containers or uncontained. Modified sulfur cement is prepared by mixing together molten sulfur at a temperature of about 120°–180° C. and 2 to 40 weight percent, preferably 2 to 10 percent, of a suitable organic modifier, for a period of to about 4 hours. The resulting modified sulfur cement product can be used while still in the molten condition in accordance with the present invention, or, conveniently cooled to a solid that can be flaked, pelletized, granulated or otherwise reduced to a convenient size for subsequent remelt and use, especially with further additives such as aggregate and other inert materials.

Suitable organic modifiers for use in the present invention to improve the stability and other properties of the material include dicyclopentadiene, dipentene, vinyltoluene, oligomers of cyclopentadiene and mixtures thereof. Especially preferred are oligomeric mixtures of cyclopentadiene trimers through tetramers and mixtures thereof with up to 75 percent by weight dicyclopentadiene. Preferably the oligomer should be used with at least 10 percent by weight dicyclopentadiene to assure complete reaction with the sulfur and avoid the need for excessively high reaction temperatures. When the total amount of modifier added to the sulfur is in the preferred range of 2 to 10 weight percent, it is most preferred that the modifier contain 35 to 50 weight percent oligomer and 65 to 50 weight percent dicyclopentadiene. Above 10 weight percent modifier concentration amount of oligomer or at least 60 weight percent in the modifier are preferable.

Modified sulfur cement prepared in the manner described can be used as a backfill or barrier material in accordance with the present invention, and, when hard, possesses good tensile and compressive strength, corrosion resistance and is superior to hydraulic (portland) cements. Its properties, can, however, be advantageously further improved by incorporation into the molten mass of up to about 15 percent by weight of certain inert additives such as silica flour, mica, glass, metallic or mineral fibers or frits or mixtures thereof.

Modified sulfur cement, either with or without the noted inert additives, can also advantageously be combined with various aggregates to further improve its strength and extend the utilization of the material in accordance with the invention. Typical of the aggregates which can be combined with the modified sulfur cement are sand, quartz and limestone. Although lesser amounts can be used, typically, the amount of aggregate will be 50 to 85 percent, based on the total weight of the resulting modified sulfur concrete. Mixing of the aggregate and modified sulfur cement is carried out by first heating the aggregate to about 150°–170° C. and blending for about 1 to 2 minutes with the molten modified sulfur cement at a temperature of about 130° to 150° C. Alternatively, solidified, particulate sulfur cement can be mixed with aggregate that first is heated to about 175° C. and then melted.

As with the modified sulfur cement, modified sulfur concrete can be used in accordance with the present invention directly while in the fluid state or allowed to cool and solidify and then be crushed or broken into powdered, flake or granular form or pelletized for convenient use later.

Figure 2:
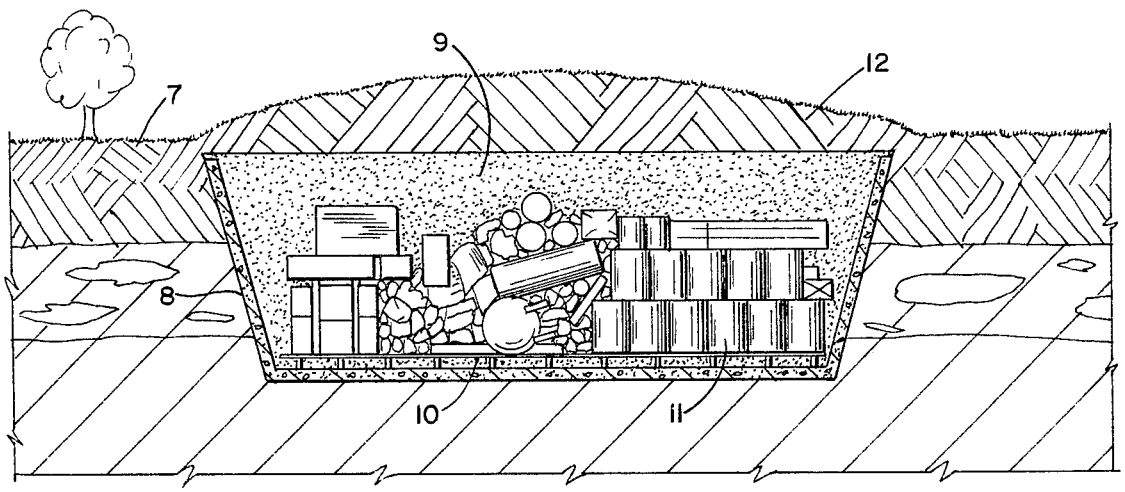

The method of the present invention, whereby modified sulfur cement and modified sulfur concrete are used as barrier and backfill materials for the containment of waste materials is illustrated by FIGS. 1 and 2 of the drawings.

In FIG. 1, two underground excavations are shown in a host rock or other formation 1. A canister or other container containing a waste material 2 is shown disposed within one of the excavations while a number of containers or other packages containing waste material 4 is disposed within the other excavation. In both instances, the containers 2 and 4 of waste material are surrounded by modified sulfur cement or concrete 5, which has been placed in the molten state into the excavation around the containers of waste material and then allowed to cool and harden. In one instance, however, the excavation is then capped with a plug 3 which may be of other material. A backfill of molten sulfur cement or concrete 6 is then placed over the plug 3 to complete the containment of the waste material 2.

In FIG. 2 of the drawings an open pit or trench has been excavated at ground surface 7 and lined with modified sulfur cement or concrete 8. It is also understood that the pit or trench may in fact be unlined or lined with other materials such as conventional hydraulic cement or concrete. A false bottom is provided at 10 upon which is rested the waste material which may be either packaged or unpackaged. Molten sulfur cement or concrete is then poured into the excavation and over and around the bodies of waste material so that it is completely enveloped. A covering 12 of soil or other material is then provided over top of the cast modified sulfur concrete or cement to complete the containment of the waste material.

A particular advantage of modified sulfur cements and concretes in the present invention, besides the desirable corrosion and wear resistant properties, is, that the material can be emplaced in a fluid state in a molten condition which solidifies into a hard monolithic material upon cooling. Unlike materials of the prior art, however, modified sulfur cements and concretes can be again rendered molten by being heated to permit examination or removal of the waste material. In contrast, materials such as portland cement or concrete, once cured, are rendered permanently solid and can only be removed by breaking up the hardened material which, of course, carries with it the hazard of disrupting the waste substance.

Depending on the type of aggregate, modified sulfur concrete can be designed to be more than two times stronger (tensile and compressive) strength) in comparable portland cement or concrete. Modified sulfur cements and concretes attain almost their full strength within hours of pouring as compared to several weeks of ordinary cement and concretes. Moreover, modified sulfur cements and concretes cure equally well under freezing conditions that are highly detrimental to the curing of portland cements and concretes.

Modified sulfur cements and concretes are also extremely resistant to corrosion of many industrial chemicals including most acids and salts. They are also highly resistant to mineralized and salt waters because they resist attack by carbonate sulphate and chloride ions and absorb very little moisture. By contrast, portland cement concrete often absorb three percent or more moisture. Thus, among their attractive properties modified sulfur cements and concretes are materials which are highly resistant to corrosion in ground water and marine environments. Although sulfur cements will melt when their temperature rises above 119° C. and also are combustible, they have relatively low thermoconductivity so that their heat penetration is slow enabling a modified sulfur concrete to survice short exposures to fire without serious damage. Modified sulfur concretes do not support combustion and flame spread is essentially zero.

What I claim is:

1. A method for the confinement and isolation of toxic waste material which comprises depositing said waste material in an excavation and encasing the waste material with a molten composition poured into said excavation and comprising the reaction product of sulfur and about 2 to 40 weight percent based on the sulfur of a modifier or modifiers selected from the group consisting of dicyclopentadiene, dipentene, vinyltoluene and oligomers of cyclopentadiene and allowing said molten composition to harden to form a solid mass having incorporated therein said waste material.

2. The method of claim 1 wherein said composition is combined with aggregate prior to encasing with said waste material.

3. The method of claim 1 wherein said composition further includes up to 15 percent by weight inert material selected from the group consisting of silica flour, mica, and glass, metallic and mineral fibers and frits.

4. The method of claim 1 wherein said waste material is radioactive waste.

5. The method of claim 1 wherein said molten composition contains about 2 to 10 weight percent of said plasticizers.

6. The method of claim 1 wherein said plasticizer is a mixture of an oligomer of cyclopentadiene and up to 75 percent by weight of dicyclopentadiene.

7. The method of claim 6 wherein said oligomer is a mixture of the trimers through tetramers of cyclopentadiene.

8. The method of claim 5 wherein said plasticizer is a mixture containing 35 to 50 weight percent of an oligomer of cyclopentadiene and 65 to 50 weight percent dicyclopentadiene.

9. The method of claim 2 wherein said aggregate is heated to about 150° to 170° C. before being blended with said molten composition.

10. The method of claim 2 wherein said aggregate is heated to about 175° C. before being blended with said composition in the solid particulate state and the blend maintained at 130° to 150° C.

11. The method of claim 2 wherein the amount of aggregate is about 50 to 86 percent by weight.

12. The method of claim 1 wherein said reaction product is in solid, particulate form which is heated to form said molten composition prior to combining with said waste material.

13. The method of claim 12 wherein said solid particulate reaction product is combined with aggregate.

14. The method of claims 1 or 2 wherein said excavation is provided with a liner prior to depositing therein said waste material.

15. The method of claims 1 or 2 wherein said solid mass encasing the waste material forms a cap over the excavation which is covered with ground material.

16. The method of claims 1 or 2 wherein said mass completely envelops said waste material.

17. The method of claim 14 wherein said liner comprises said composition.

18. The method of claims 1 or 2 wherein said excavation is subterranian.

19. the method of claims 1 or 2 wherein said excavation is an open, surface excavation.

* * * * *